US012664085B2

(12) United States Patent
Nadgauda et al.

(10) Patent No.: US 12,664,085 B2
(45) Date of Patent: Jun. 23, 2026

(54) TRIGGERING NON-TARGET ON-DIE TERMINATION ON A MEMORY DEVICE

(71) Applicant: SanDisk Technologies LLC, Austin, TX (US)

(72) Inventors: Rohit Nadgauda, San Jose, CA (US); Siddhesh Darne, Milpitas, CA (US); Sukneet Basuta, San Jose, CA (US); Kyle Zerner, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 100 days.

(21) Appl. No.: 18/669,824

(22) Filed: May 21, 2024

(65) Prior Publication Data

US 2025/0363045 A1 Nov. 27, 2025

(51) Int. Cl.
*G11C 8/00* (2006.01)
*G06F 12/02* (2006.01)

(52) U.S. Cl.
CPC ................................. *G06F 12/0246* (2013.01)

(58) Field of Classification Search
CPC ................................................ G06F 12/0246
USPC ........................................................ 365/233.1
See application file for complete search history.

(56) References Cited

U.S. PATENT DOCUMENTS

| | | | |
|---|---|---|---|
| 9,780,782 B2 | 10/2017 | Bains | |
| 9,792,983 B2 | 10/2017 | Hirashima | |
| 10,074,423 B1 * | 9/2018 | Hermesh | G11C 5/06 |
| 10,089,257 B2 | 10/2018 | Takeyama | |
| 10,205,431 B2 * | 2/2019 | Kang | G11C 29/028 |
| 11,200,190 B2 * | 12/2021 | Zhao | G11C 29/50008 |
| 11,295,794 B2 * | 4/2022 | Itagaki | G11C 7/1048 |
| 11,461,051 B2 * | 10/2022 | Hwang | G06F 13/4086 |
| 12,254,954 B2 * | 3/2025 | Wei | G11C 29/025 |
| 2021/0166743 A1 * | 6/2021 | Itagaki | G11C 7/1048 |
| 2022/0050802 A1 * | 2/2022 | Zhao | G06F 13/4086 |
| 2022/0057965 A1 * | 2/2022 | Hwang | G06F 3/0688 |
| 2022/0164141 A1 * | 5/2022 | Hong | G06F 3/0604 |
| 2023/0090800 A1 * | 3/2023 | Kimura | G11C 7/1048 |
| | | | 711/154 |
| 2025/0252979 A1 * | 8/2025 | De Luna | G11C 7/20 |

* cited by examiner

*Primary Examiner* — Viet Q Nguyen

(74) *Attorney, Agent, or Firm* — Arlene Neal; NEAL BLIBO LLC

(57) ABSTRACT

A storage device may trigger a non-target on-die termination (ntODT) on non-target dies in a memory device. A controller on the storage device may send a command to a target die. When a memory device including the target die and the non-target dies, receives a chip enable (CE) signal, the target die and non-target dies listen to the command. If the communication channel includes one CE bucket, the non-target dies in the CE bucket use the address of the target die to determine that they are non-target dies. If the communication channel includes more than one CE buckets, the non-target dies in a CE bucket that does not include the target die, use a command trigger to determine that they are non-target dies. The non-target dies turn on the ntODT during data transmission and turn off the ntODT when the data transmission is complete.

19 Claims, 6 Drawing Sheets

TRIGGERING NON-TARGET ON-DIE TERMINATION ON A MEMORY DEVICE

BACKGROUND OF THE INVENTION

A storage device may be communicatively coupled to a host and to non-volatile memory including, for example, a NAND flash memory device on which the storage device may store data received from the host. The memory device may include multiple communications channels, each connected to one or more dies, wherein connecting multiple dies on a channel may increase the capacity of the storage device. A controller on the storage device may transmit signals to and receive signals from dies on a communications channel via a communications interface between the storage device and the memory device. The signals may include commands to read data from or write data to the dies on the memory device.

A die to which a signal is directed is referred to as a target die. The other dies on a channel that are not the intended recipients of the signal are referred to as non-target dies. When multiple dies are connected to a channel, all the dies on the channel may contribute to the signal quality. In situations where there is high die load on a channel, an on-die termination (ODT) feature may be used to terminate input signals, helping to maintain high quality signals between the controller and a target die. Non-target dies may also help to maintain the signal quality using a non-target ODT. The ODT and non-target ODT features may be enabled when the storage device and/or memory device are being booted up. During the boot up stage, an optimal ODT value and an optimal non-target ODT value may be provided to the dies on the memory device such that when a command is sent to a target die, the target die may use the optimal ODT value, and the non-target dies may use to non-target ODT value for signals associated with a command. The optimal ODT value and the optimal non-target ODT value may be different.

In a non-Separate Command and Address (SCA) port configuration, to increase the number of dies connected to a channel, the ODT and/or non-target ODT feature may be enabled via command-based triggers or a write-protect pin. When the ODT and non-target ODT are enabled via command-based triggers and when a signal is being transmitted to a target die, the non-target dies may be directed to turn on the non-target ODT, then a command may be sent to the target die for the data being written/read, and after the command to the target die is satisfied, the non-target dies may be directed to disable the non-target ODT. Toggling between the target die and non-target dies may be cumbersome and may reduce the performance of the storage device.

In enterprise systems, the same channel may have multiple chip-enabled (CE) switches/buckets (referred to herein as CE) such that each CE may be associated with a group of dies. For example, if a channel includes five CEs, each of which is associated with four dies, the first CE may direct signals to dies 0-3, the second CE may direct signals to dies 4-7, and so on. So, if a target die and the non-target dies are connected to different CEs, using command-based triggers may involve switching between target and non-target dies connected to different CEs which may be more cumbersome and may result in more performance degradation on the storage device.

When the write-protect pin is used to enable the ODT and non-target ODT, the controller may toggle the write-protect pin to instruct non-target dies to turn on the non-target ODT. To reduce costs and/or the controller size, one write-protect pin may be provided for the controller and that write-protect pin may service every die in the system. So, when the controller enables the write-protect pin for one channel, the controller may be unable to enable the write-protect pin for other channels, causing the controller to not be able to trigger non-target ODT in different channels with the write-protect pin. To use the write-protect pin in other systems, a write-protect pin may be provided per channel, which may increase the overall cost and/or area of the controller.

SUMMARY OF THE INVENTION

In some implementations, the storage device may trigger a non-target on-die termination (ntODT) on non-target dies in a memory device. A controller on the storage device may send a command to a target die on a communications channel that includes at least one chip enable (CE) bucket. A memory device on the storage device may include the target die and the non-target dies. When the memory device receives a CE signal, the target die and non-target dies listen to the command and/or an address of the target die to identify the non-target dies. The non-target dies turn on the ntODT during data transmission and turn off the ntODT when the data transmission is complete.

In some implementations, a method is provided on a storage device for triggering ntODT on non-target dies in a memory device that includes a target die and the non-target dies on at least one communications channel. The communications channel may include at least one CE bucket. The method includes receiving a CE signal and listening, by the target die and non-target dies, to a command signal and/or an address of the target die to identify the non-target dies. The method further includes determining by the non-target dies that they are non-target dies, turning on, by the non-target dies, the ntODT during data transmission, and turning off, by the non-target dies, the ntODT when the data transmission is complete.

In some implementations, a storage device may trigger a ntODT on non-target dies in a memory device. The storage device includes a controller to send a command to a target die on a communications channel that may include at least one CE bucket. The storage device also includes a memory device including the target die and the non-target dies. The memory device may receive a CE signal and when the communications channel includes at least one CE bucket and the CE signal is asserted, the target die and the non-target dies on the CE bucket listen to the command and an address of the target die. The non-target dies may determine that they are non-target dies based on the address, turn on the ntODT during data transmission, and turn off the ntODT when the data transmission is complete. When the memory device receives the CE signal and when the communications channel includes more than one CE buckets and the CE signal on a first CE bucket is asserted, the non-target dies connected to a second CE bucket that does not include the target die may listen to a command signal. When a command latch enable (CLE) is triggered while the CE signal for the second CE bucket is deactivated, the non-target dies connected to the second CE may determine that they are non-target dies, turn on the ntODT during data transmission, and turn off the ntODT when the data transmission is complete.

Figure 1:
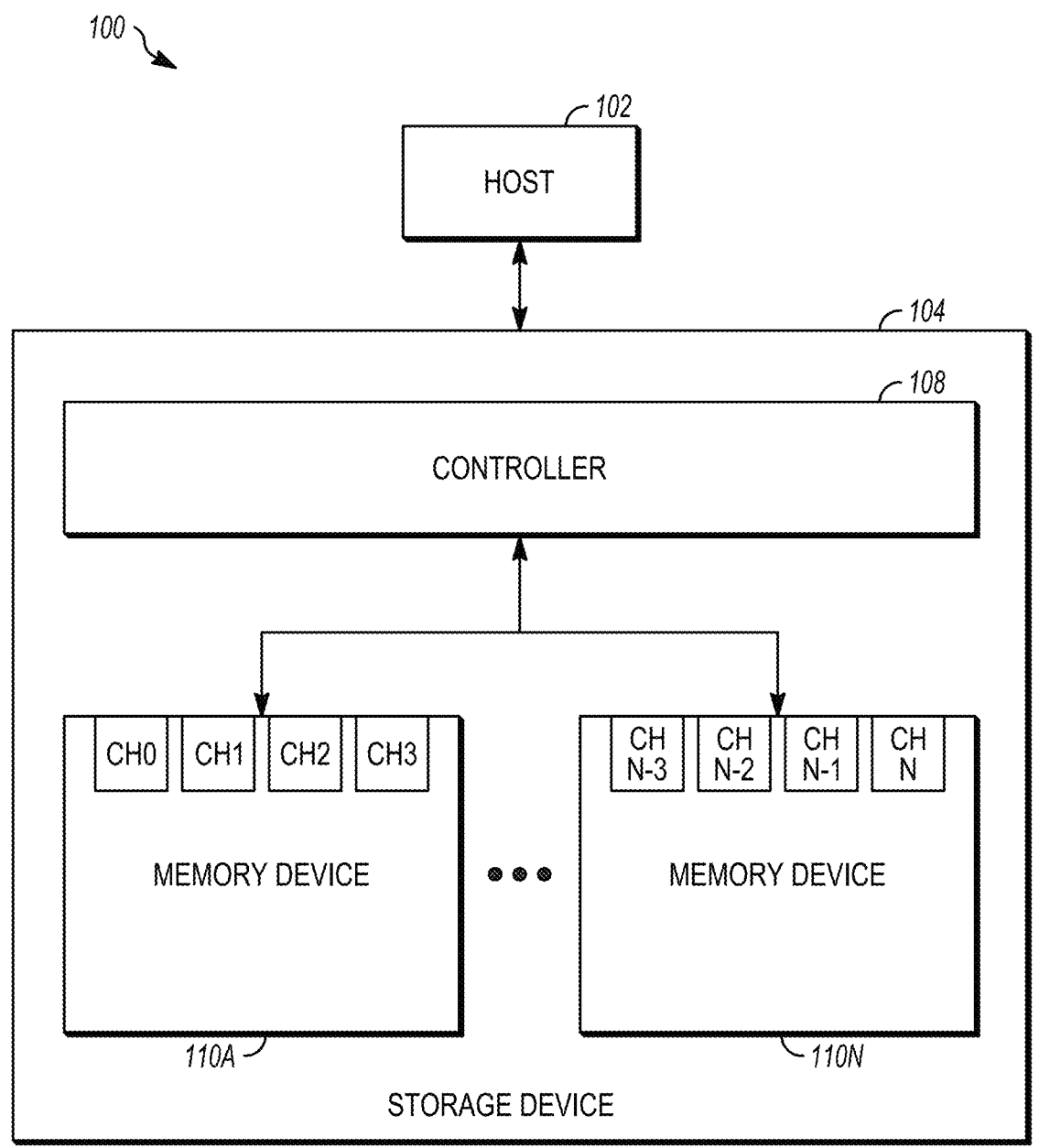
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements, FIG. 1 is a schematic block diagram of an example system in accordance with some implementations. System 100 includes a host 102 and a storage device 104 that may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a controller 108 and one or more non-volatile memory devices 110a-110n (referred to herein as the memory device(s) 110). Storage device 104 may be, for example, a solid-state drive (SSD). Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may include multiple communications channels (shown, for example as CH0-CHN, referred to herein as channel(s)/CH(s)), each of which may be associated with one or more dies.

Controller 108 may transmit signals to and receive signals from the dies on a communications channel via a communications interface between controller 108 and memory device 110. The signals may include a chip enable (CEn) signal which may turn on and off input/output circuitry (not shown in this figure but described in FIGS. 2-4) on memory device 110. When a CEn signal on a communications channel is asserted, dies on memory device 110 may turn on a listening circuitry (not shown in this figure but described in FIGS. 2-4) to examine a command latch enable (CLE) signal, an address latch enable (ALE) signal, a write enable (WEn) signal, a read enable (REn), data strobe signals (DQS), input/output ports (DQ), and/or a write protect signal (WPn). When the CLE is asserted, controller may send a command (CMD) on the DQ. When the ALE is asserted, controller may send an address (ADDR) on the DQ. The WEn may be used to sample the CMD and ADDR. DQS may be used to sample the data on the DQ.

When storage device 104/memory device 110 is booted up/initialized, controller 108 may enable an ODT feature, wherein an optimal ODT value and non-target ODT value may be provided to the dies on memory device. The ODT feature may direct a die on a channel to turn on the ODT when the die determines that it is a target die for a command being sent from controller 108. The ODT feature may also direct a die on a channel to turn on the non-target ODT when the die determines that it is a non-target die for a command being sent from controller 108.

In a first implementation in for example, client systems, where a configuration includes a channel with a CE switch/bucket (referred to herein as a CE) for all dies, controller 108 may trigger the input/output circuitry on memory device 110 to toggle the non-target ODT in non-target dies without using a write-protect pin. When controller 108 wants to send a command to a target die, the CEn signal may be asserted. To send the command to, for example, write data to the target die, controller 108 may start a command cycle, wherein when a CMD in the cycle is sent, the CLE signal may be asserted. All the dies on the channel may listen to the CMD being sent. A WEn signal may be used to sample CMD, so the dies know which command is being sent. When the command transmission is complete, controller 108 may start an address cycle to send the address for the target die, wherein when an ADDR is sent, the ALE signal may be asserted. A WEn signal may be used to sample the ADDR and all the dies on the channel may listen to the ADDR being sent. Based on the ADDR, the non-target dies may determine that they are not the recipients of the command and may turn on the non-target ODT to the value provided during a boot up stage. When the non-target ODT is turned on WPn may be asserted. When CEn signal or CLE signal goes up, the non-target dies may determine that the target die has satisfied the command and may turn off the non-target ODT.

If the interface between storage device 104 and memory device 110 is a center tap termination (CTT) interface (also generically referred to as Stub Series Terminated Logic (SSTL)), the channel may be connected to a power supply and ground for the ODT. So, when the non-target ODT is enabled in a CTT interface, extra current may be drawn when the non-target ODT is turned on. If, on the other hand, a low tap termination (LTT) interface (also generically referred to as Low Voltage Swing Terminated Logic (LVSTL)) is used between storage device 104 and memory device 110, the channel may only be connected to ground through non-target ODT. As such, no extra current may be drawn when a "0" is driven on the channel, but extra current may be drawn when "1" is driven on the channel, for example, from controller 108 or a selected die.

In a second implementation in, for example, in enterprise systems, a configuration may include a communications channel with multiple CEs, each of which may be associated with a group of dies on the channel. For example, if a channel (CH0) is associated with eight dies and includes two CEs (CE0/first CE and CE1/second CE), CE0 may be associated with dies 0-3 and CE1 may be associated with dies 4-7 on CH0. In this configuration, a non-target die on a different CE may not sense the ADDR being sent on another CE.

In this configuration, rather than look at the CEn signal to enable the input/output circuitry on a die, the dies may look at the CLE or ALE signals because all the dies in a channel may see a CLE or ALE triggering even if they are associated with different CEs. Using the example where CH0 is associated with eight dies and includes CE0 and CE1, where CE0 may be associated with dies 0-3 and CE1 may be associated with dies 4-7, controller 108 may send a command to die 2 in CE0. When controller 108 pulls CEn to the activated state and sends the CMD and ADDR, non-target dies 0, 1, and 3 (i.e., the dies on the same CE switch) may sense the CMD/ADDR as described in the first implementation and turn on the non-target ODT. The CEn signal for CE1 may be in a deactivated state as the command is not being sent to a die associated with that CE. When the CEn signal for a CE is in a deactivated state, the non-target ODT is enabled on memory device 110, and the CLE is triggered, the dies on that CE may sense the triggering of the CLE and turn on the non-target ODT. So, when the CEn signal for CE1 is in a deactivated state, the non-target ODT is enabled on memory device 110, and the CLE is triggered to send the command to die 2, dies 4-7 may sense the CMD on the CLE and turn on the non-target ODT regardless of the ADDR cycle data because dies 4-7 may determine that they are non-target dies because of the CEn signal. When the CEn is triggered or the CLE is asserted, dies 4-7 (i.e., the dies on another CE) may turn off the non-target ODT.

Like the first implementation, if the interface between storage device 104 and memory device 110 is a CTT interface, when the non-target ODT is enabled, extra current may be drawn when the non-target ODT is turned on. If the interface is a LTT interface, no extra current may be drawn when a "0" is driven on the channel, but extra current may be drawn when "1" is driven on the channel, for example, from controller 108 or a selected die. In the configuration with multiple CEs on a channel, if the CEn signal is off, it may be possible for the CLE receiver to stay on while the ALE and WEn receivers remain off cycle to reduce the power consumption. Like the configuration with one CEn, the write-protect pin may not be required in configurations with multiple CEs.

In a third implementation where there are multiple CEs, controller 108 may set WPn to ODT mode. Prior to sending data on the DQ, controller 108 may pulse the WPn signal to enable non-target ODT instead of holding the WPn signal to the activated state when the non-target ODT is turned on. When a non-target die senses the pulse of the WPn signal, the non-target die may turn on the non-target ODT until the non-target die senses another pulse of the WPn signal. This may free up the WPn for other flash interface modules (FIMs) during the length of a data transfer. Attempting to use the WPn simultaneously may require FIM pipelining and more complex communication between FIMs which may result in a performance hit from needing to stagger transfers to avoid hazard.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2A:
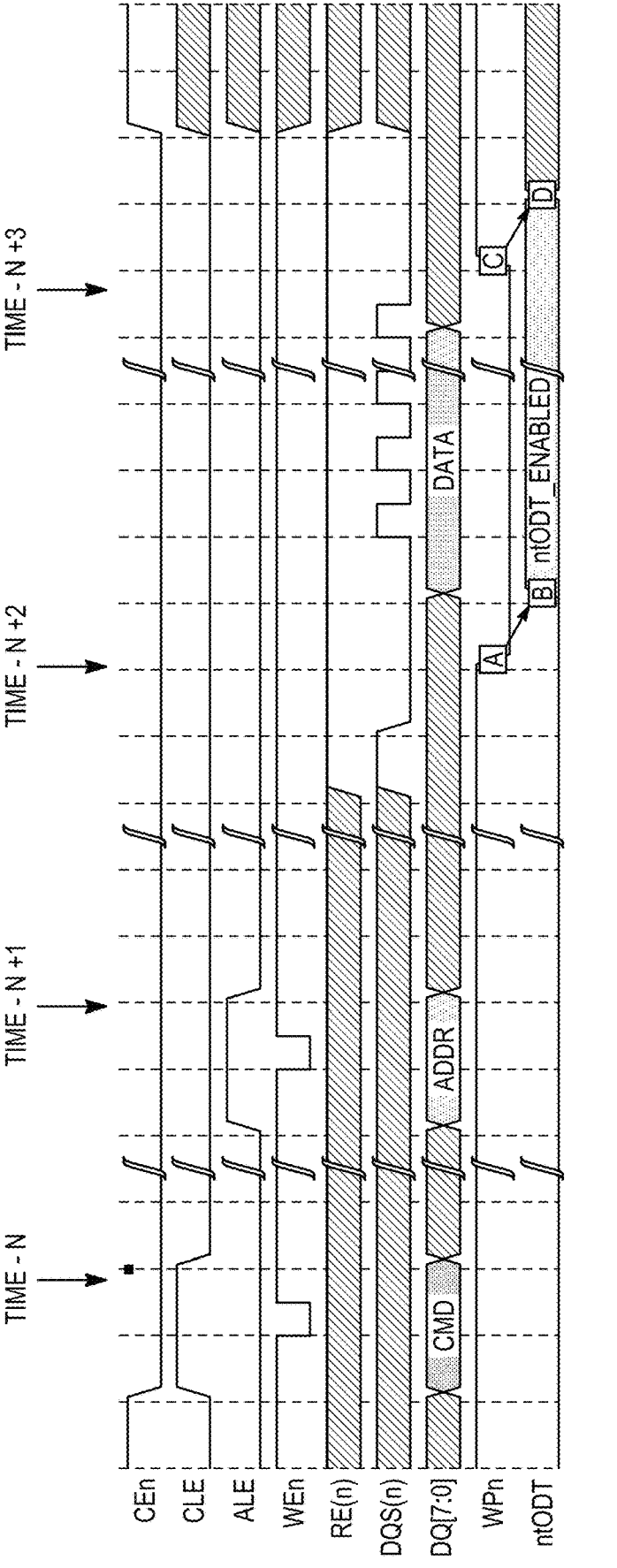
FIG. 2A is a diagram showing how a non-target ODT is triggered in a configuration including a channel with a CE for all dies.

FIG. 2A is a diagram showing how a non-target ODT is triggered in a configuration including a channel with a CE for all dies. At time N, controller 108 may send a command to a target die by setting the CEn signal to the activated state and setting the CLE signal to the activated state, wherein a CMD may be sent to the target die on the DQ. All the dies on the channel may listen to the CMD being sent and a WEn signal may be used to sample the CMD. At time N+1, controller 108 may send the address for the target die by setting the ALE signal to the activated state and sending an ADDR on the DQ. A WEn signal may be used to sample the ADDR and all the dies on the channel may listen to the ADDR being sent. At time N+2, before the data is sent on the DQ, a write-protect pin may be sent (shown as A), driving WPn to the activated state. When the non-target dies sense the write protect pin, the non-target dies may enable the non-target ODT (ntODT) (shown as B). At time N+3, after the data transfer is complete, the write protect pin may be sent (shown as C), driving WPn to the deactivated state and when the non-target dies sense the write protect pin, the non-target dies may turn off the non-target ODT (shown as D).

Figure 2B:
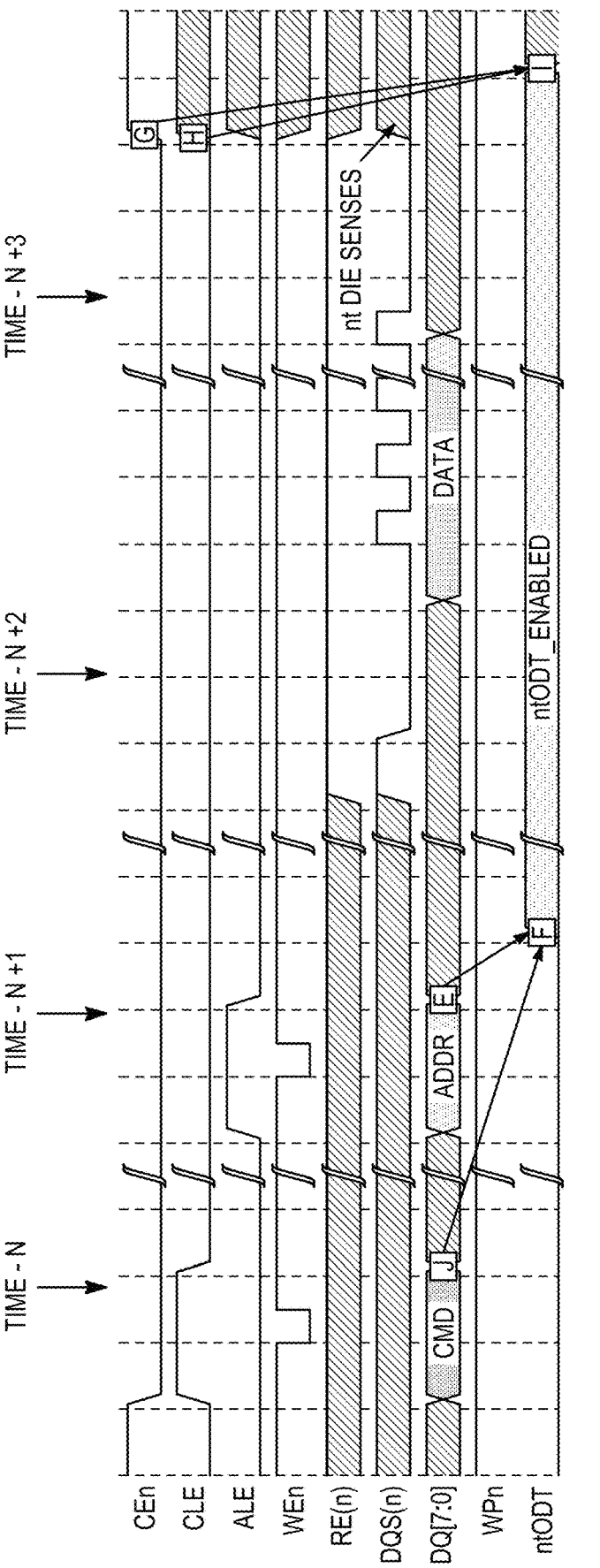
FIG. 2B is a diagram showing how a non-target ODT is triggered in a configuration including a channel with a CE for all dies in accordance with some implementations.

FIG. 2B is a diagram showing how a non-target ODT is triggered in a configuration including a channel with a CE for all dies in accordance with some implementations. At time N, controller 108 may send a command to a target die by asserting the CEn signal and setting the CLE signal to the activated state, wherein a CMD may be sent to the target die on the DQ. All the dies on the channel may listen to the CMD being sent and a WEn signal may be used to sample the CMD (shown as J). At time N+1, controller 108 may send the address for the target die by setting the ALE signal to the activated state and sending an ADDR on the DQ. A WEn signal may be used to sample the ADDR and all the dies on the channel may listen to the ADDR being sent (shown as E). Based on the ADDR, the non-target dies may determine that they are not the recipients of the command and may turn on the non-target ODT (ntODT) to the value provided during a boot up stage (shown as F).

When WPn is asserted, the non-target ODT may be turned on. At time N+2, data may be sent on the DQ. At time N+3, when CEn signal is de-asserted (shown as G) or CLE signal is asserted (shown as H), the non-target dies may determine that the target die has satisfied the command and may turn off the non-target ODT (shown as I). In this implementation, controller 108 may toggle the non-target ODT in non-target dies without using a write-protect pin as shown in FIG. 2A. As indicated above FIGS. 2A and 2B are provided as examples. Other examples may differ from what is described in FIGS. 2A and 2B.

Figure 3:
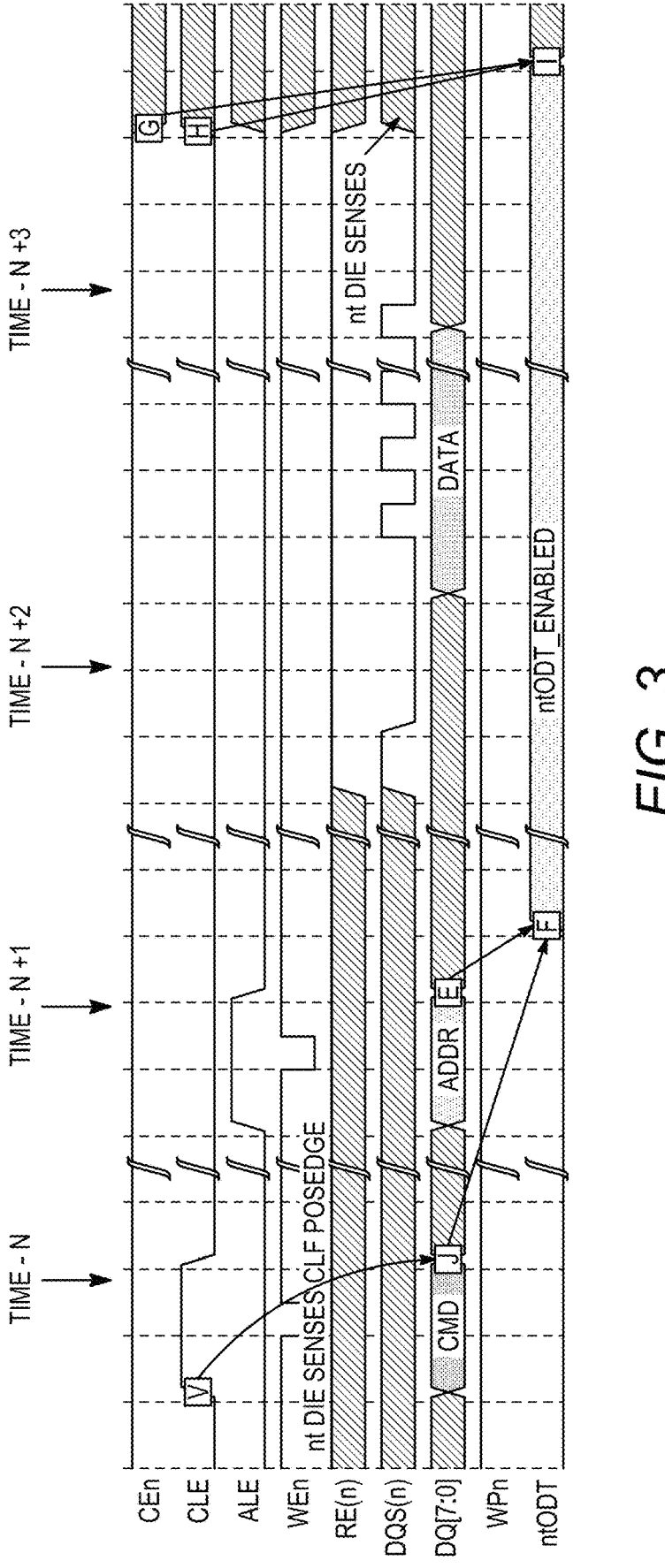
FIG. 3 is a diagram showing how a non-target ODT is triggered in a configuration including a communications channel with multiple chip enable switches/buckets (CE) in accordance with some implementation.

FIG. 3 is a diagram showing how a non-target ODT is triggered in a configuration including a communications channel with multiple chip enable switches/buckets (CEs) in accordance with some implementation. At time N, controller 108 may send a command to a target die associated with a first CE, keeping a second CE on the channel deactivated and asserting the CLE signal (shown as V), wherein a CMD may be sent to the target die on the DQ. All the dies on the channel (i.e., dies associated with the first CE and the second CE) may listen to the CMD being sent and a WEn signal may be used to sample CMD (shown as J).

At time N+1, controller 108 may send the address for the target die by asserting the ALE signal and sending an ADDR on the DQ. A WEn signal may be used to sample the ADDR and all the dies on the first CE may listen to the ADDR being sent (shown as E). Based on the ADDR, the non-target dies on the first CE may determine that they are not the recipients of the command and may turn on the non-target ODT (ntODT) to the value provided during a boot up stage (shown as F). The dies on the second CE may determine that they are non-target dies because of the deactivated CEn signal and the triggering of the CLE and may turn on the non-target ODT. At time N+2, data may be sent on the DQ. At time N+3, when CEn signal is triggered (shown as GG) or CLE signal is asserted (shown as H), the non-target dies on the channel may determine that the target die has satisfied the command and may turn off the non-target ODT (shown as I). In this implementation, controller 108 may also toggle the non-target ODT in non-target dies without using a write-protect pin as shown in FIG. 2A. As indicated above FIG. 3 is provided as an example. Other examples may differ from what is described in FIG. 3.

Figure 4:
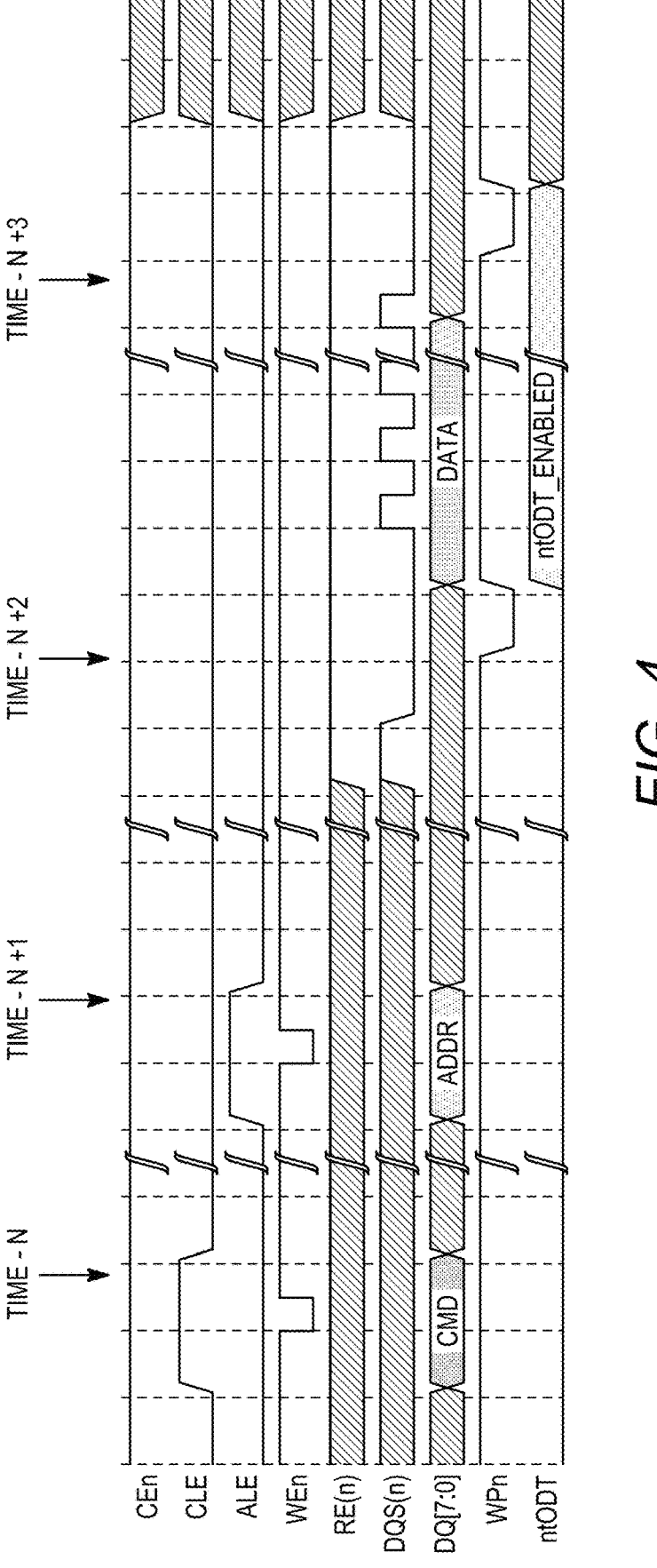
FIG. 4 is another diagram showing how a non-target ODT is triggered in a configuration including a communications channel with multiple CEs in accordance with some implementation.

FIG. 4 is another diagram showing how a non-target ODT is triggered in a configuration including a communications channel with multiple CEs in accordance with some implementation. At time N, controller 108 may send a command to a target die associated with a first CE, setting a second CE on the channel to the deactivated state and setting the CLE signal to the activated state, wherein a CMD may be sent to the target die on the DQ. All the dies on the channel (i.e., dies associated with the first CE and the second CE) may listen to the CMD being sent and a WEn signal may be used to sample CMD.

At time N+1, controller 108 may send the address for the target die by asserting the ALE signal and sending an ADDR on the DQ. A WEn signal may be used to sample the ADDR and all the dies on the first CE may listen to the ADDR being sent. Based on the ADDR, the non-target dies on the first CE may determine that they are not the recipients of the command. The dies on the second CE may also determine that they are non-target dies because of the CEn signal on the second CE and the triggering of the CLE. At time N+2, prior to sending data on the DQ, the WPn may be pulsed, wherein when the non-target dies on the first and second CE sense the pulsing of the WPn, the non-target dies may turn on the non-target ODT to the value provided during a boot up stage. At time N+3, when the data transmission is complete, the WPn may be pulsed, wherein when the non-target dies on the first and second CE sense the pulsing of the WPn, the non-target dies may turn off the non-target ODT. As indicated above FIG. 4 is provided as an example. Other examples may differ from what is described in FIG. 4.

Figure 5:
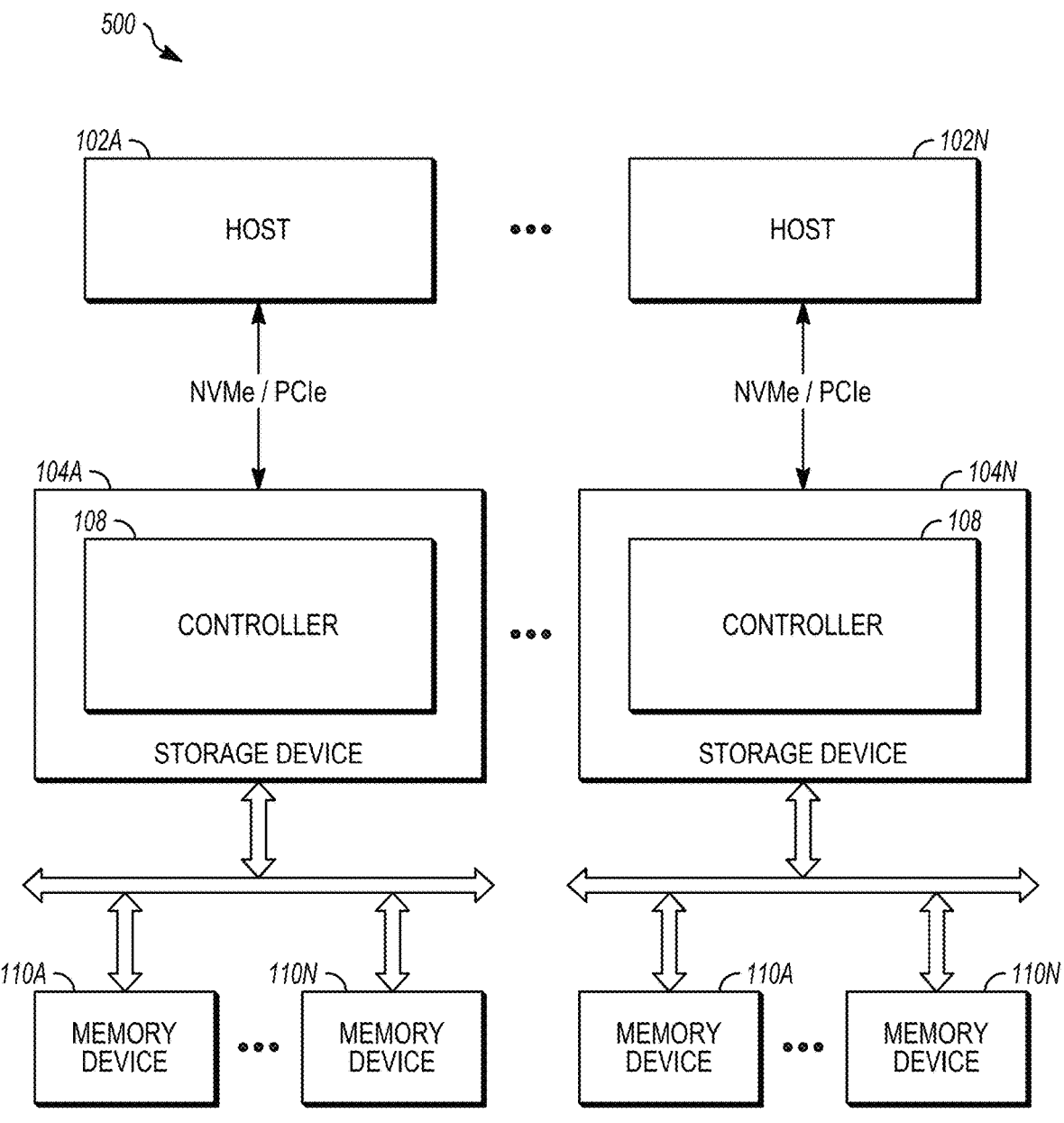
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102n (referred to herein as host(s) 102), and one or more storage devices 104a-104n (referred to herein as storage device(s) 104). Storage device 104 may include a controller 108 to send commands to dies in memory device 110, wherein the non-target dies may turn on the non-target ODT based on the CEn and/or CLE signals. Hosts 102 and storage devices 104 may communicate via Non-Volatile Memory Express (NVMe) over peripheral component interconnect express (PCI Express or PCIe), or the like.

Devices of Environment 500 may interconnect via wired connections, wireless connections, or a combination of wired and wireless connections. For example, the network in FIG. 5 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to trigger a non-target on-die termination (ntODT) on non-target dies in a memory device, the storage device comprises:

a controller to send a command to a target die on a communications channel, wherein the communications channel comprises at least one chip enable (CE) bucket; and a memory device including the target die and the non-target dies, wherein when the memory device receives a CE signal, the target die and non-target dies listen to at least one of the command and an address of the target die to identify the non-target dies, the non-target dies turn on the ntODT during data transmission, and turn off the ntODT when the data transmission is complete, wherein an optimal ntODT value is provided to the dies on the memory device when the memory device is initialized.

2. The storage device of claim 1, wherein when the communications channel includes one CE bucket and the CE signal is asserted, the target die and the non-target dies listen to the command and the address of the target die, and the non-target dies determine that they are non-target dies based on the address.

3. The storage device of claim 2, wherein when the CE signal is asserted, a command latch enable (CLE) is asserted, the command is sent on input/output ports, and a write enable signal is used to sample the command, and when the command is complete, an address latch enable (ALE) is asserted, the address of the target die is sent on the input/output ports, and the write enable signal is used to sample the address.

4. The storage device of claim 3, wherein the non-target dies determine that the data transmission is complete when one of the CE signal and the CLE is asserted.

5. The storage device of claim 1, wherein when the communications channel includes more than one CE buckets and the CE signal on a first CE bucket is asserted, the target die and the non-target dies connected to the first CE bucket listen to the command and the address of the target die, the non-target dies connected to the first CE bucket determine that they are non-target dies based on the address, turn on the ntODT during data transmission, and turn off the ntODT when the data transmission is complete, and the non-target dies connected to a second CE bucket listen to the command and when a CLE is triggered while the CE signal for the second CE bucket is deactivated, the non-target dies connected to the second CE bucket determine that they are non-target dies, turn on the ntODT during data transmission, and turn off the ntODT when the data transmission is complete.

6. The storage device of claim 5, wherein the non-target dies determine that the data transmission is complete when one of the CE signal is triggered and the CLE is asserted.

7. The storage device of claim 1, wherein when the communications channel includes at least one CE bucket and a write protect mode is set to an on-die-termination mode, prior to sending data, a write-protect signal is pulsed and the non-target dies turn on the ntODT during data transmission and turn off the ntODT when the data transmission is complete and the write-protect signal is pulsed.

8. The storage device of claim 1, wherein an optimal on-die termination value is provided to the dies on the memory device when the memory device is initialized.

9. A method for triggering a non-target on-die termination (ntODT) on non-target dies in a memory device comprising a target die and the non-target dies on a communications channel including at least one chip enable (CE) bucket, the method comprising:

receiving an optimal ntODT value by dies on the memory device when the memory device is initialized;

receiving a CE signal;

listening by the target die and non-target dies to at least one of a command signal and an address of the target die to identify the non-target dies, determining by the non-target dies that they are non-target dies and turning on the ntODT during data transmission; and turning off, by the non-target dies, the ntODT when the data transmission is complete.

10. The method of claim 9, wherein when the communications channel includes one CE bucket and the CE signal is asserted, the method includes:

listening, by the target die and non-target dies, to the command signal and the address of the target die; and determining, by the non-target dies, that they are non-target dies based on the address.

11. The method of claim 10, wherein when the CE signal is asserted, the method includes setting a command latch enable (CLE) to the activated state, sending a command on input/output ports, and using a write enable signal to sample the command, and when the command is complete, setting an address latch enable (ALE) to the activated state, sending the address of the target die on the input/output ports, and using the write enable signal to sample the address.

12. The method of claim 11, further comprising determining by the non-target dies that the data transmission is complete when one of the CE signal and the CLE is asserted.

13. The method of claim 9, wherein when the communications channel includes more than one CE buckets and the CE signal on a first CE bucket is asserted, the method comprises:

listening, by the target die and the non-target dies connected to the first CE bucket, to a command and the address of the target die, determining, by the non-target dies connected to the first CE bucket, that they are non-target dies based on the address, turning on, by the non-target dies connected to the first CE bucket, the ntODT during data transmission, and turning off, by the non-target dies connected to the first CE bucket, the ntODT when the data transmission is complete, and listening, by the non-target dies connected to a second CE bucket, to the command signal, determining, by the non-target dies connected to the second CE bucket, that they are non-target dies when a CLE is triggered while the CE signal for the second CE bucket is deactivated, turning on, by the non-target dies connected to the second CE bucket, the ntODT during data transmission, and turning off, by the non-target dies connected to the second CE bucket, the ntODT when the data transmission is complete.

14. The method of claim 13, further comprising determining by the non-target dies that the data transmission is complete when one of the CE signal is triggered and the CLE is asserted.

15. The method of claim 9, wherein when the communications channel includes at least one CE bucket and a write protect mode is set to an on-die-termination mode, prior to sending data, the method includes pulsing a write-protect signal, determining, by the non-target dies, that they are non-target dies and when the write-protect signal is pulsed, turning on, by the non-target dies, the ntODT during data transmission, and turning off, by the non-target dies, the ntODT when the data transmission is complete and the write-protect signal is pulsed.

16. The method of claim 9, further comprising receiving an optimal on-die termination value by dies on the memory device when the memory device is initialized.

17. A storage device to trigger a non-target on-die termination (ntODT) on non-target dies in a memory device, the storage device comprises:

a controller to send a command to a target die on a communications channel that includes at least one chip enable (CE) bucket; and a memory device including the target die and the non-target dies, wherein the memory device receives a CE signal and when the communications channel includes at least one CE bucket and the CE signal is asserted, the target die and the non-target dies on the CE bucket listen to the command and an address of the target die, the non-target dies determine that they are non-target dies based on the address, turn on the ntODT during data transmission, and turn off the ntODT when the data transmission is complete; and wherein the memory device receives the CE signal and when the communications channel includes more than one CE buckets and the CE signal on a first CE bucket is asserted, the non-target dies connected to a second CE bucket that does not include the target die listen to a command signal and when a command latch enable (CLE) is triggered while the CE signal for the second CE bucket is deactivated, the non-target dies connected to the second CE determine that they are non-target dies, turn on the ntODT during data transmission, and turn off the ntODT when the data transmission is complete.

18. The storage device of claim 17, wherein an optimal on-die termination value and an optimal ntODT value are provided to the dies on the memory device when the memory device is initialized.

19. The storage device of claim 17, wherein the non-target dies determine that the data transmission is complete when one of the CE signal is triggered and the CLE is asserted.

* * * * *